United States Patent [19]
Walton

[11] 3,898,812
[45] Aug. 12, 1975

[54] HYDROSTATIC TRANSMISSION CONTROL SYSTEM

[75] Inventor: Erlen Busch Walton, Farmington Hills, Mich.

[73] Assignee: Eaton Corporation, Cleveland, Ohio

[22] Filed: June 17, 1974

[21] Appl. No.: 479,672

[52] U.S. Cl. .................. 60/431; 60/443; 60/445; 60/449; 60/465
[51] Int. Cl.² ............................................ F16D 31/00
[58] Field of Search ............ 60/391, 423, 427, 431, 60/433, 434, 443, 449, 465; 180/6.48

[56] References Cited
UNITED STATES PATENTS

| | | | |
|---|---|---|---|
| 3,164,960 | 1/1965 | Weisenbach et al. | 60/426 X |
| 3,284,999 | 11/1966 | Lease | 60/433 X |
| 3,354,981 | 11/1967 | Swanson et al. | 60/399 X |

Primary Examiner—Edgar W. Geoghegan
Attorney, Agent, or Firm—Teagno & Toddy

[57] ABSTRACT

An improved hydrostatic transmission control system includes a main control valve which varies the speed at which a vehicle is driven as a function of variations in throttle setting, engine output speed, and displacement of the hydrostatic transmission. Upon actuation of a brake pedal, a linkage effects a deswashing of a pump unit in the hydrostatic transmission to reduce the speed at which the vehicle is driven. Continued actuation of the brake pedal causes the linkage to effect engagement of the vehicle brakes.

25 Claims, 4 Drawing Figures

HYDROSTATIC TRANSMISSION CONTROL SYSTEM

BACKGROUND OF THE INVENTION

The present invention relates to a new and improved hydrostatic transmission control system and more specifically to a hydrostatic transmission control system which is advantageously utilized in association with a vehicle.

There are many known hydrostatic transmission drive arrangements which are utilized in association with vehicles. Some of these known hydrostatic transmission drive arrangements have been provided with control systems having valves which are subjected to a biasing force which varies as a function of throttle setting and/or engine output speed. Some of these known control systems are disclosed in U.S. Pat. Nos. 2,931,250; 3,225,618; 3,230,699; and 3,349,860.

Prior to actuation of vehicle brakes, it is desirable to reduce the speed at which the drive wheels of a vehicle are driven. In an effort to provide coordination between braking and the speed at which the wheels of the vehicle are driven, known hydrostatic transmission control systems have associated the vehicle brake control system with the system for controlling the displacement of the hydrostatic transmission. Some of these known control systems are disclosed in U.S. Pat. Nos. 3,349,860; 3,354,981; and 3,539,040.

SUMMARY OF THE PRESENT INVENTION

The present invention provides a new and improved hydrostatic transmission control system which includes a main control valve assembly having a valve member which is movable under the influence of three separate forces to vary the output speed of a hydrostatic transmission. The control valve is urged in a direction tending to increase the displacement of the hydrostatic transmission under the influence of a force which varies as a function of output speed of an engine which drives the pump unit of the hydrostatic transmission. The valve member is urged in a direction tending to reduce the displacement of the pump unit under the influence of a force which varies as a function of throttle setting. In addition, the valve member is urged in a direction tending to reduce displacement of the pump unit under the influence of a force which varies as a function of displacement of the pump unit.

To reduce wear on the vehicle braking system and to provide for low speed or inching control of a vehicle, a brake pedal is advantageously connected with a linkage which effects a reduction in the output speed of the hydrostatic transmission prior to actuation of the vehicle brakes. Thus, during a first portion of an operating stroke of the brake pedal, the linkage effects a reduction in the displacement of the pump unit of the hydrostatic transmission. The linkage then effects actuation of the vehicle brakes.

Accordingly, it is an object of this invention to provide a new and improved hydrostatic transmission control system having a main control valve which varies output speed of a hydrostatic transmission as a function of engine speed, in throttle setting, and the displacement of the hydrostatic transmission.

Another object of this invention is to provide a new and improved hydrostatic transmission control system in which actuation of a brake pedal effects a reduction in transmission output speed prior to application of a vehicle brake.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

Figure 1:
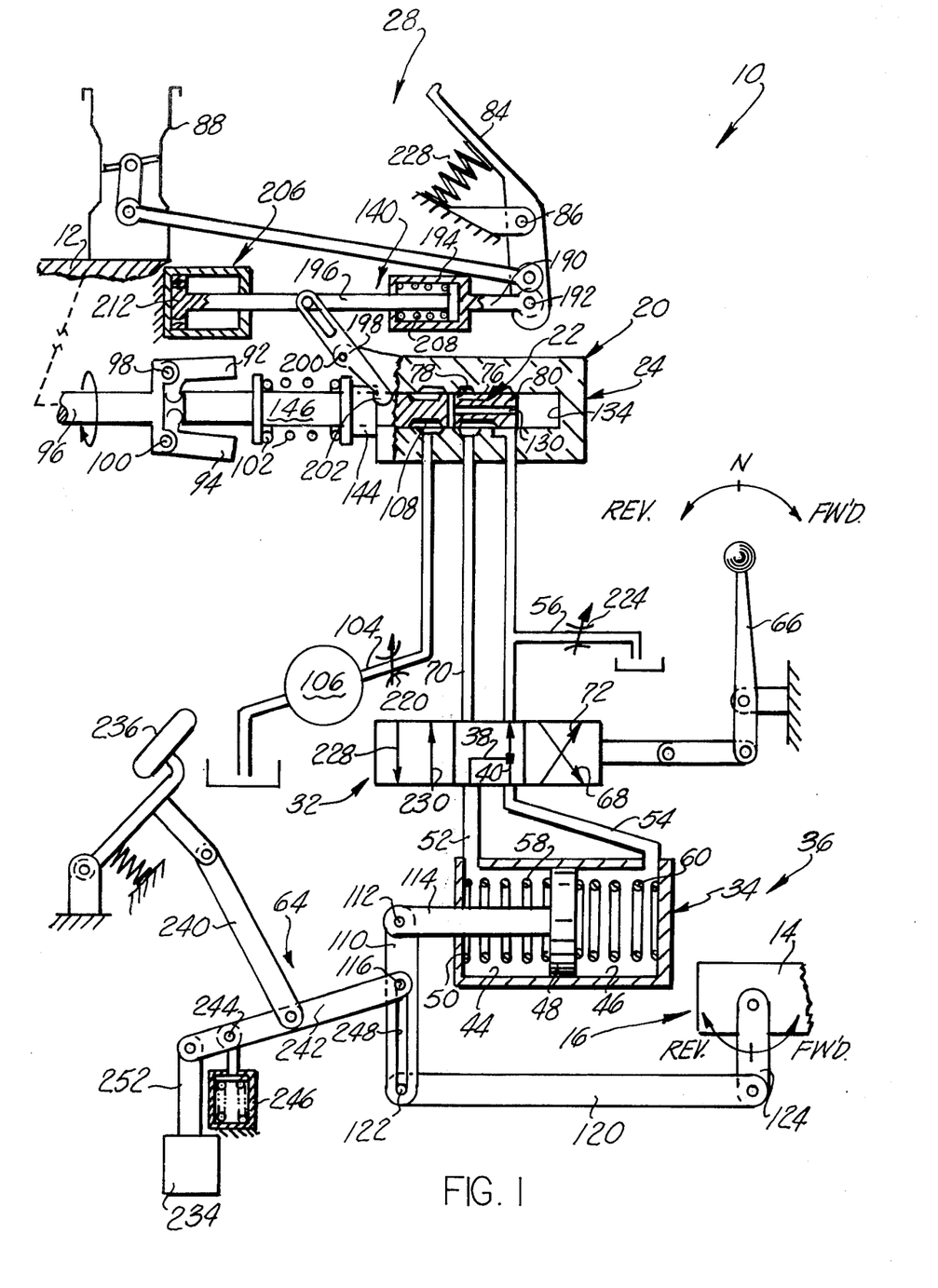
FIG. 1 is a schematic illustration of a hydrostatic transmission control system constructed in accordance with the present invention.

A hydrostatic transmission control system 10 is illustrated in FIG. 1 in association with a vehicle having an engine 12 which drives a pump unit 14 of a hydrostatic transmission 16. The hydrostatic transmission 16 includes a motor unit (not shown) which is driven in a known manner by fluid from the pump unit 14 to drive an output shaft connected with a vehicle drive train. The hydrostatic transmission control system 10 includes a main valve assembly 20 having a valve spool or member 22 which is moved relative to a housing 24 under the influence of three distinct forces to control the displacement of the pump unit 14. Thus, the valve member 22 is urged toward the right (as viewed in FIG. 1) under the influence of a force which varies as a direct function of the output speed of the engine 12. The valve spool 22 is urged toward the left (as viewed in FIG. 1) under the influence of a force which varies as a function of the setting of a throttle control assembly 28. In addition, the valve spool 22 is urged toward the left under the influence of a force which varies as a direct function of variations in the displacement of the pump unit 14.

When a directional control valve 32 is in the illustrated neutral position, a fluid motor 34 in an actuator assembly 36 is connected with drain through valve passages 38 and 40. Thus, opposite chambers 44 and 46 formed by cooperation between a piston 48 and cylinder 50 are connected with drain through conduits 52, 54, the valve passages 38 and 40, and a conduit 56. This enables the piston 48 to be maintained in the centered or neutral position illustrated in FIG. 1 under the influence of biasing springs 58 and 60.

When the piston 48 is in the centered and neutral position of FIG. 1, a linkage 64 effects movement of the swashplate of the pump unit 14 to a neutral position. When the swashplate of the pump unit 14 is in neutral, the pump unit has a minimum displacement and the hydrostatic transmission 16 is ineffective to drive the wheels or tracks of an associated vehicle.

A control handle 66 is pivotal in a clockwise direction (as viewed in FIG. 1) to effect movement of the main control valve 32 from the illustrated neutral position to a forward actuated position. When the control valve 32 is in the forward position, a chamber 46 of the fluid motor 34 is connected with the main control valve assembly 20 through a valve passage 68 which connects the conduit 54 in fluid communication with a conduit 70. The opposite motor chamber 44 is connected with drain through a valve passage 72 and the conduit 56.

When the engine 12 is idling, the valve spool 22 remains in the position shown in FIG. 1 in which the conduit 70 is connected with drain through an annular groove 76 disposed between a pair of annular valve lands 78 and 80. Since the opposite chambers 44 and 46 of the motor 34 are connected with drain, the motor remains in the neutral position shown in FIG. 1. Of course the pump unit 14 is in a deswashed condition so that the vehicle is not driven forward while the engine operates at the relatively low idling speed.

To effect forward movement of the vehicle, the accelerator pedal 84 in the throttle control assembly 28 is pivoted in a counterclockwise direction (as viewed in FIG. 1) about a connection 86 to actuate an engine carburetor 88 to increase the output speed of the engine 12 in a known manner. Increasing the output speed of the engine 12 increases the speed at which a pair of flyweights 92 and 94 are rotated by a drive shaft 96. The drive shaft 96 is rotated about its central axis at a speed which varies as a direct function of the engine output speed.

As the engine output speed increases and the rotational speed of the drive shaft 96 increases the flyweights 92 and 94 move outwardly about pivot connections 98 and 100 under the influence of centrifugal force. This outward movement of the flyweights 92 and 94 moves the valve spool 22 toward the right (as viewed in FIG. 1) against the influence of a biasing spring 102. Rightward movement of the valve spool 22 connects the conduit 70 with a conduit 104 which is supplied with relatively high pressure fluid by an engine driven charge pump 106. When the flyweights 92 and 94 shift the valve spool 22 toward the right from the illustrated neutral position, fluid from the conduit 104 flows through an annular groove 108 in the valve spool to the inlet of the passage 70.

Since the directional control valve 32 was previously operated to a forward actuated condition, the high pressure fluid flows from the conduit 70 through the valve passage 68 to the motor chamber 46. This effects leftward movement (as viewed in FIG. 1) of the piston 48, against the influence of the biasing spring 58, to increase the forward displacement of the pump unit 14. Thus, as the piston 48 moves toward the left, a link 110 which is pivotally connected at 112 with a piston rod 114, is pivoted in a counterclockwise direction (as viewed in FIG. 1) about a pivot connection 116. This pivotal movement of the link 110 shifts a link 120, to which the link 110 is pivotally connected at 122, toward the right. This rightward movement of the link 120 pivots a link 124 connected with the swashplate of the pump unit 14 in a counterclockwise direction to increase the forward operating displacement of the pump unit 14.

As the piston 48 is moved against the influence of the biasing spring 58, the fluid pressure in the chamber 46 increases. This increased fluid pressure is transmitted through the valve passage 68 and the conduit 70 to a generally T-shaped passage 130 in the valve spool 22. The passage 130 is connected with a pressure chamber 134 at the right (as viewed in FIG. 1) end of the valve spool 22. As the displacement of the pump 14 and fluid pressure in the chamber 134 increase, the valve spool 22 shifts toward the left (as viewed in FIG. 1) against the influence of the engine driven flyweights 92 and 94. This leftward movement of the valve spool 22 shifts the annular land 78 into alignment with the entrance of the passage 70 to thereby block fluid flow through the passage 70. Of course, this interrupts operation of a motor 34. It should be noted that the fluid pressure in the chamber 134 varies as a direct function of variations in the fluid pressure in the motor chamber 46 and the displacement of the pump unit 14.

If the accelerator pedal 84 is subsequently depressed still further, the output speed of the engine 12 increases so that the flyweights 92 and 94 are effective to overcome the influence of the feedback pressure against the right end of the valve spool 22. This results in a shifting of the valve spool 22 toward the right (as viewed in FIG. 1). Of course, this effects further operation of the motor 34 to increase the displacement of the pump unit 14.

The force exerted by the flyweights 92 and 94 on the valve spool 22 is sufficient to cause the motor 34 to be operated to actuate the pump unit 14 to a fully swashed or maximum displacement condition before the maximum output speed of the engine 12 is obtained. Once the pump unit 14 is fully swashed, further depressing or actuation of the accelerator pedal 84 results in a further increase in the output speed of the engine 12. Of course, this increased output speed increases the volumetric fluid flow output of the pump unit 14 since the pump unit is driven faster. However, once the pump unit 14 has been fully swashed, its displacement can not be further increased with further increases in engine speed. After the pump unit 14 has reached a maximum displacement condition further depression of the accelerator pedal 84 increases the speed at which the pump unit 14 is driven to thereby increase the output speed of the hydrostatic transmission 16.

During operation of the vehicle at a relatively high speed with the pump unit 14 in a fully swashed condition and the engine 12 operating at a speed substantially in excess of the speed necessary to effect operation of the pump unit 14 to the fully swashed condition, the engine 12 could tend to be overloaded due to the tracks or wheels of the vehicle encountering excessive resistance to movement of the vehicle. If the operator maintains the accelerator pedal 84 in a fully depressed condition upon the encountering of an excessive load condition, there may be a tendency for the engine 12 to stall.

In order to prevent stalling of the engine 12 under the influence of an excessive load during high speed vehicle operation, the leftward (as viewed in FIG. 1) force applied to the valve spool 22 increases with movement of the accelerator pedal 84 past a position corresponding to maximum displacement of the pump unit 14. Thus, the throttle linkage 140 is operable to slide a collar 144 along a shaft 146 which is integrally formed with the valve spool 22. This sliding movement of the collar 144 compresses the spring 102 to apply a leftward (as viewed in FIG. 1) force to the valve spool 22. This leftward force cooperates with the feedback pressure force applied to the right (as viewed in FIG. 1) end of the valve spool 22 to oppose the force applied the valve spool by the flyweights 92 and 94. In the absence of an impending stall, the centrifugal force on the flyweights 92 and 94 is sufficient to overcome the combined effects of the feedback pressure force in chamber 134 and the influence of the spring 102.

Upon the occurrence of an impending overloading of the engine 12, the output speed of the engine will decrease. This results in a decrease in the rightward (as viewed in FIG. 1) force applied to the valve spool 22 by the flyweights 92 and 94. As this occurs, the combined influence of the fluid pressure force against the right end of the valve spool 22 and the force of the compressed spring 102 is sufficient to cause the valve spool to move toward the left from a position in which the annular land 78 blocks the inlet opening to the conduit 70 toward the open position shown in FIG. 1. As this occurs, the conduit 70 is connected with drain through the groove 76 in the valve spool 22. This relatively low pressure is conducted to the motor chamber 46 through the conduit 54 so that the biasing spring 58 is effective to move the piston 48 back toward the neutral position shown in FIG. 1. As this occurs, the linkage 64 is actuated to reduce the displacement of the pump unit 14. Reducing the displacement of the pump unit 14 reduces the output speed of the hydrostatic transmission 16 and the load on the engine 12.

Figures 2, 3:
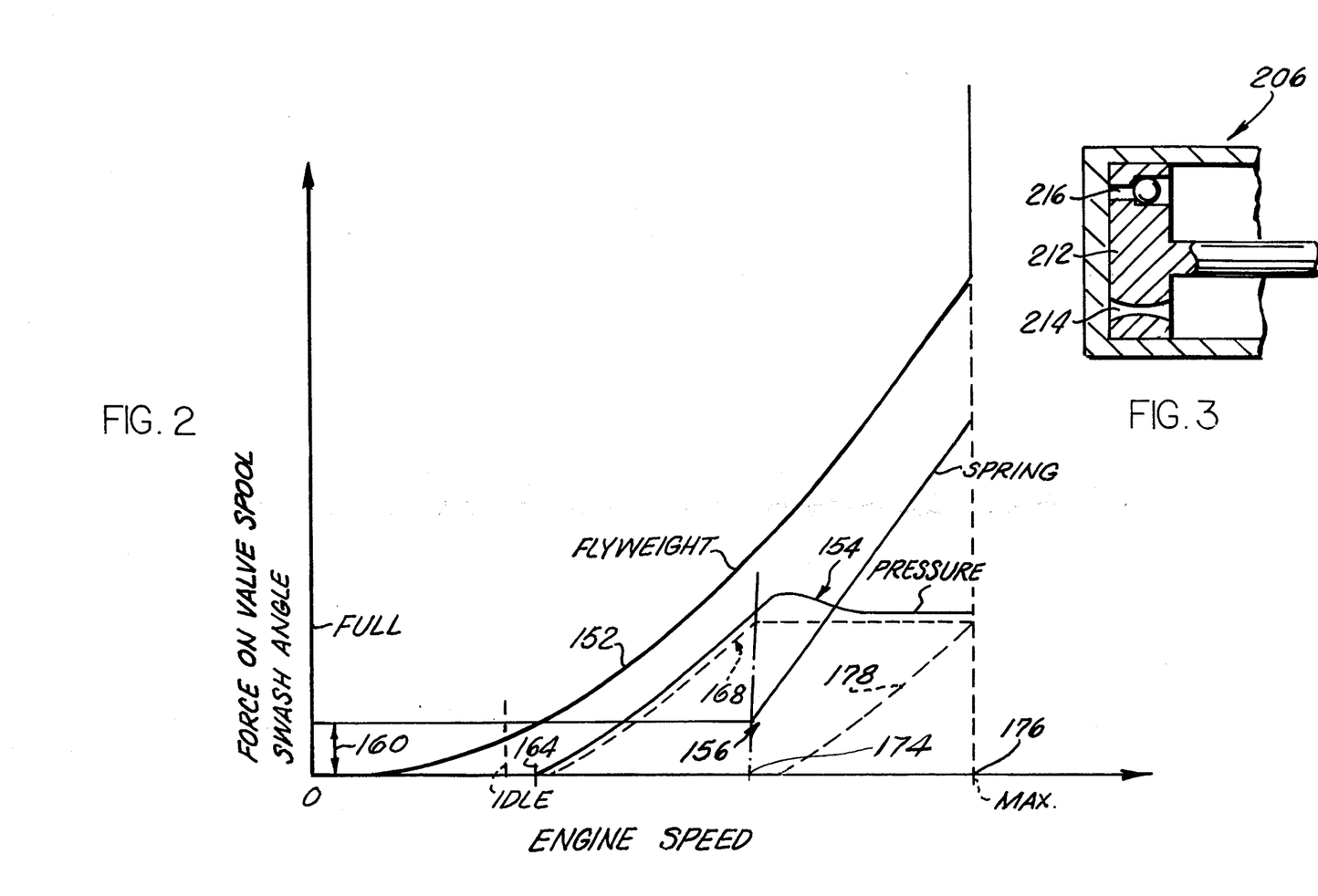
FIG. 2 is a graph depicting the variations in forces applied to a main control valve as a function of variations in engine speed, throttle setting, and pump displacement.
FIG. 3 is an enlarged illustration of a dashpot utilized in the control system of FIG. 1.

The relationship between the force applied to the valve spool 22 by the flyweights 92 and 94, the fluid pressure force applied against the right end of the valve spool, and the force applied to the valve spool by the spring 102 is illustrated in FIG. 2. The relationship between the force applied to the valve spool 22 by the flyweights 92 and 94 and engine speed is depicted by the curve 152. The relationship between engine speed and the fluid pressure feedback force applied to the right end of the valve spool 22 is depicted by the curve 154 in FIG. 2. Finally, the relationship between engine speed and the force applied to the valve spool 22 by the spring 102 is depicted by the curve 156. It should be noted that the spring 102 is preloaded when the valve assembly 20 is in the neutral condition of FIG. 1. Therefore, the spring 102 is effective to provide an initial preload force, indicated as 160 in FIG. 2, to the valve spool 22.

The initial preload force applied by the spring 102 to the valve spool 22 urges the valve spool 22 toward the illustrated neutral position in which both chambers 44 and 46 of the motor are connected with drain. This leftward (as viewed in FIG. 1) spring force is opposed by the force applied to the valve spool by the flyweights 92 and 94. When the engine is operating at idle speed the spring preload force, indicated by the curve 156, is greater than the force applied to the valve spool by the flyweights 92 and 94 and represented by the curve 152. Therefore, the flyweights are ineffective to move the valve spool against the influence of the spring force.

As the engine speed increases slightly beyond idle to a speed indicated at 164 in FIG. 2, the force exerted by the flyweights 92 and 94 is ineffective to move the valve spool 22. However, as the engine speed increases beyond the speed indicated at 164 in FIG. 2, the force exerted by the flyweights 92 and 94 is effective to move the valve spool 22 toward the right from the position shown in FIG. 1 to port fluid under pressure to the motor 34. As this occurs, the displacement of the pump unit 14 increases in the manner depicted graphically by the curve 168 in FIG. 2. As the displacement of the pump unit 14 increases, the feedback pressure applied against the right end of the valve spool 22 increases in the manner depicted by the curve 154. It should be noted that in the absence of an impending stall condition, the fluid pressure feedback force applied to the valve spool 22 from the motor 34 varies as a direct function of variations in displacement of the pump unit 14.

The pump unit 14 reaches a maximum displacement condition at an engine speed indicated at 176 in FIG. 2. It should be noted that at this time the spring 102 is applying only the preload force 160 to the valve spool 22. The flyweight force applied to the valve spool 22, indicated by the curve 152, is equal to the sum of the fluid pressure feedback force (depicted by the curve 154) and the constant spring preload force (depicted by the curve 156).

Once the engine 12 has been accelerated to a speed corresponding to the maximum displacement of the pump unit 14, that is the speed indicated by the point 174 in FIG. 2, further actuation of accelerator pedal 84 operates the throttle linkage 140 to slide the collar 144 axially along the shaft portion 146. This compresses the spring 102 to increase the force applied to the valve spool in a manner which varies as a direct function of variations in the extent to which the accelerator pedal 84 is depressed.

After the pump unit 14 has reached a maximum displacement condition, further actuation of the accelerator pedal 84 results in a generally linear increase in the output speed of the engine 12. Therefore, the flyweights 92 and 94 are effective to apply a force which increases as a direct function of engine output speed. In the absence of an impending stall, the increasing force applied to the valve spool 22 by the spring 102 is offset by the oppositely directed and increasing force applied to the valve spool by the flyweights 92 and 94. At this time the fluid pressure feedback force applied against the right end of the valve spool remains substantially constant and the annular land 78 on the valve spool 22 blocks flow from the motor chamber 46.

If the vehicle should encounter excessive resistance to forward movement during operation of the engine 12 at a maximum speed that is the speed indicated by the point 176 in FIG. 2, with the pump 14 in a fully swashed condition, output speed of the engine 12 will decrease. The spring force applied to the valve spool 22 by the spring 102 and the fluid pressure force applied against the right end of the valve spool are not effected by a decrease in the operating speed of the engine 12. Therefore as the engine 12 slows down under the excessive load, the force applied by the flyweights 92 and 94 to the valve spool 22 decreases and the valve spool is shifted toward the left (as viewed in FIG. 1).

As the valve spool 22 shifts, the chamber 46 in the motor 34 is connected with drain around the land 78. This results in rightward movement of the piston 48 from the maximum displacement condition to effect a reduction in the displacement of the pump unit 14 in the manner indicated by the portion 178 of the curve 168. Of course this results in a decrease in the fluid pressure force applied against the right (as viewed in FIG. 1) end of the valve spool 22.

When the displacement of the pump unit 14 decreases by an amount sufficient to compensate for the increased load on the engine, the operating speed of the engine 12 is sufficient to cause the flyweights 92 and 94 to move the valve spool 22 toward the right from the position shown in FIG. 1 to again block fluid flow from the chamber 46 of the motor 34. At this time to pump unit 14 has a displacement which is less than its maximum displacement. Reducing the displacement of the pump unit 14 increases the input-to-output speed ratio of the hydrostatic transmission 16 to reduce the load on the engine 12. Therefore, the engine 12 can operate under heavy loads at a speed which is less than its maximum output speed without danger of stalling. It should be noted that the accelerator pedal 84 remains fully depressed as this is occurring.

The throttle linkage 140 includes a link 190 which is pivotally connected at 192 with the accelerator pedal 84. A spring box 194 interconnects the link 190 and a link 196. The link 196 is pivotally connected with an actuator arm 198 which is pivotal about a connection 200 to slide the collar 144 along the shaft portion 146.

Upon movement of the accelerator pedal 84 in a counter-clockwise direction about the pivot connection 86, the links 190 and 196 move the arm 198 in a clockwise direction about the pivot connection 200. As the arm moves about the connection 200, an end portion 202 of the arm moves into engagement with the slidable collar 144. Continued depression of the accelerator pedal 84 and pivotal movement of the arm 198 moves the collar 144 toward the left (as viewed in FIG. 1) to compress the spring 102. As the spring 102 is compressed, a spring force applied to the valve spool increases from the preload force in the manner depicted graphically by the curve 156 in FIG. 2. Of course, as the spring 102 is being compressed the carburetor 88 is being actuated to increase the output speed of the engine 12 so that the flyweights 92 and 94 are rotated at a higher speed to increase the flyweight force applied against the valve spool 22 in the manner illustrated by the curve 152 in FIG. 2.

Upon rapid depression of the accelerator pedal 84, the carburetor 88 is actuated to increase the output speed of the engine 12. However, there is a short time lag between rapid depression of the accelerator pedal 84 and the resulting increase in the output speed of the engine 12. If the throttle linkage 140 was actuated to immediately compensate for the intended increase in engine speed, the valve spool 22 would be shifted toward the left (as viewed in FIG. 1) with a resulting deswashing in the pump unit 14 until the output speed of the engine 12 increased to a speed corresponding to the extent of actuation of the accelerator pedal 84. To prevent this from happening, a single acting dashpot 206 is connected with the arm 198.

The dashpot 206 retards rightward movement of the link 196 so that a spring 208 in the spring box 192 is compressed as the accelerator pedal 84 is quickly depressed and the link 190 moved toward the right. The single acting dashpot 206 is provided with a piston 212 having a restricted opening 214 (FIG. 3) through which fluid can flow from the right side to the left side (as viewed in FIG. 3) of the piston to relax the compressed spring 208 in the spring box 194 (FIG. 1). As this occurs, the arm 198 is pivoted to move the sleeve 194 relative to the shaft portion 146. However, the time period required for the piston 212 in the dashpot 206 to move toward the right (as viewed in FIG. 1) is sufficient to compensate for the time lag in the increase in the engine output speed.

The dashpot 206 is of the single acting type and includes a check valve 216 (FIG. 3) which enables fluid to flow quickly from the left side of the piston 212 to the right side upon releasing of the accelerator pedal 84. Therefore, the dashpot 206 does not significantly retard actuation of the throttle linkage 140 in response to a releasing of the accelerator pedal 84.

A variable restriction 220 is provided in the fluid supply line 104. This restriction controls the rate of flow of fluid from the charge pump 106 to the motor 34 to thereby control the rate at which the displacement of the pump unit 14 is increased. A similar restriction 224 in the drain passage 56 limits the rate of flow of fluid from the motor 34 to drain to thereby limit the rate at which the displacement of the pump unit is decreased.

Upon releasing of the accelerator pedal 84, a biasing spring 228 pivots the accelerator pedal 84 about the connection 86. As this occurs, the carburetor 88 is actuated to reduce the output speed of the engine 12. In addition, the throttle linkage 140 is actuated to pivot the arm 198 in a counter-clockwise direction about the connection 200. This enables the sleeve 144 to move toward the right along the shaft portion 146 to thereby relax the spring 102. The feedback pressure in the chamber 134 causes the valve spool 22 to shift toward the left (as viewed in FIG. 1). This leftward shifting of the valve spool 22 connects the motor chamber 46 with drain to effect operation of the motor 34 to actuate the linkage 64 and reduce the displacement of the pump unit 14.

When the vehicle is to be driven in a reverse direction, the direction selector lever 66 is pivoted in a counter-clockwise direction to shift the directional valve 32 toward the right (as viewed in FIG. 1). This results in high pressure fluid being conducted from the main control valve 20 through a valve passage 228 to the motor chamber 44 as the accelerator pedal 84 is depressed. Of course, this effects rightward (as viewed in FIG. 1) movement of the piston 48 to actuate the linkage 64 to increase the displacement of the pump unit 14 in the reverse direction. When the directional control valve 32 is in a reverse actuated condition, a valve passage 230 connects the motor chamber 46 with the drain passage 56.

To prevent excessive wear of the vehicle brakes, which is indicated schematically at 234 in FIG. 1, the pump unit 14 of the hydrostatic transmission 16 is deswashed before the brakes are engaged. To accomplish this, depressing of a brake pedal 236 actuates the linkage 64 between the motor 36 and swashplate of the pump unit 14. This actuation of the linkage 64 pivots the lever 124 to the neutral position shown in FIG. 1. For example, when the vehicle is being driven in a forward direction, the motor 34 is in an actuated condition in which the lever 124 is disposed in a position counter-clockwise from the position shown in FIG. 1. Actuation of the brake pedal 236 effects operation of the linkage 64 to pivot the lever 124 in a clockwise direction back to the position shown in FIG. 1.

Assuming that the pump unit 14 is in a forward swashed position and the brake pedal 236 is depressed, as the brake pedal moves downwardly a link 240 pivots a link 242 clockwise about a connection 244 with a spring box 246. As the link 242 pivots about the connection 244, the pivot connection 116 moves downwardly (as viewed in FIG. 1) in a longitudinally extending slot 248. As the connection 116 moves downwardly, the link 110 is pivoted in a clockwise direction about the pivot connection 112. Since the pivot connection 112 and piston 48 are displaced to the left of the neutral position shown in FIG. 1, this clockwise pivoting movement of the link 110 about the connection 112 moves the connection 122 leftwardly back to the position shown in FIG. 1. This results in movement of the lever 124 in a clockwise direction to effect movement of the pump swashplate to the neutral position. It should be noted that the deswashing of the pump unit 14 is accomplished by operating the linkage 64 without changing the setting of the main control valve 20.

Once the pump unit 14 has been deswashed continued depressing of the brake pedal 236 results in pivoting movement of the link 242 about the connection 116 which is now at the bottom of the slot 148. This presses an actuator shaft 252 downwardly to actuate the brakes 134. Thus, initial movement of the brake pedal 236 effects a deswashing of the pump unit 14 and continued movement of the brake pedal through an operating stroke results in actuation of the brakes 234 after the pump unit 14 has been fully deswashed. The spring box 246 is provided to insure that the link 242 is pivoted to effect a deswashing of the pump unit 14 prior to actuation of the vehicle brakes 234.

In the embodiment of the invention illustrated in FIG. 1, the flyweights 92 and 94 are effective to apply to the valve spool 22 a force which varies as a function of variations in the operating speed of the engine 12. In the embodiment of the invention illustrated in FIG. 4, a fluid pressure differential force which varies as a function of variations in engine speed is applied to a valve spool of a main control valve. Also in the embodiment of the invention illustrated in FIG. 4, actuation of a brake pedal effects a deswashing of the hydrostatic transmission prior to engagement of the vehicle brakes by porting a high pressure chamber of a motor to drain. Since the embodiment of the invention illustrated in FIG. 4 has many components which are similar to and operate in the same manner as the components of the embodiment of the invention illustrated in FIG. 1, similar components will be designated by similar numerals, the suffix letter "a" being associated with the numerals of FIG. 4 to avoid confusion.

The control system 10a includes a main control valve assembly 20a having a valve spool 22a which is moved relative to a housing under the influence of three distinct forces to control the displacement of a pump unit 14a. Thus, the valve member 22a is urged toward the left (as viewed in FIG. 4) under the influence of a fluid pressure differential across a piston 280. The fluid pressure differential across the piston 280 varies as a direct function of variations in the output speed of an associated engine 12a.

The valve spool 22a is urged toward the right (as viewed in FIG. 4) under the influence of a force which varies as a function of the setting of a throttle control assembly, similar to the throttle control assembly 28 of FIG. 1. In addition, the valve spool 22a is urged toward the right (as viewed in FIG. 4) under the influence of a fluid pressure feedback force which varies as a direct function of variations in the displacement of the pump unit 14a.

Figure 4:
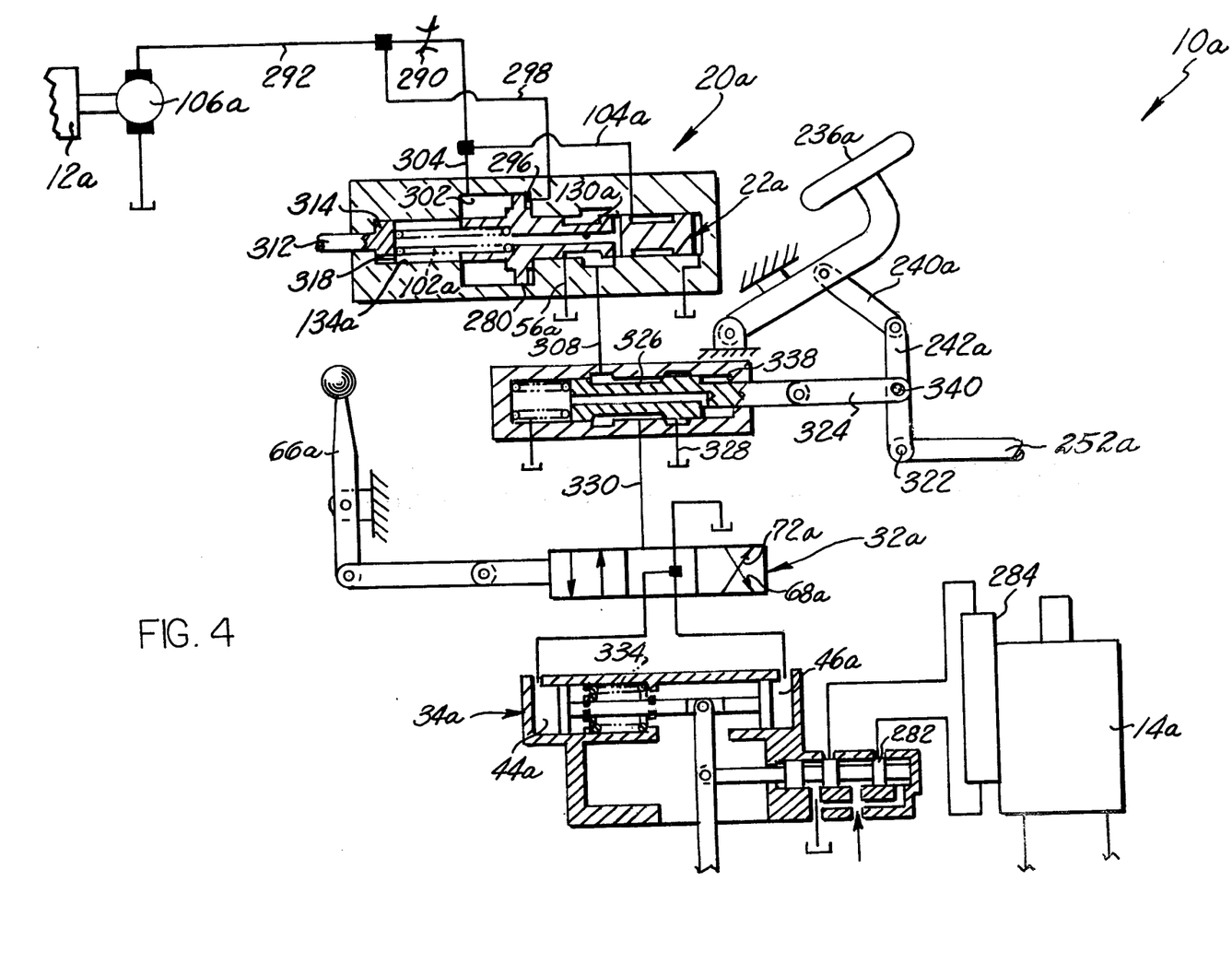
FIG. 4 is a schematic illustration of a second embodiment of the invention.

Upon operation of a direction control valve 32a from the neutral condition illustrated in FIG. 4 to a forward actuated condition, a chamber 46a in a motor 34a is connected with a source of pressure through a valve passage 68a. Similarly, an opposite motor chamber 44a is connected with drain through a valve passage 72a. The high pressure fluid in the motor chamber 46a effects movement of a pilot valve spool 282 to port fluid under pressure to an actuator assembly 284 to vary the displacement of the pump unit 14a. The construction of the motor unit 34a, the pilot valve 282, and the actuator assembly 284 and the manner in which they cooperate to vary the displacement of the pump unit 14a is the same as is disclosed in U.S. Pat. No. 3,759,109 and will not be further described herein to avoid prolixity of description.

In accordance with a feature of the embodiment of the invention illustrated in FIG. 4, a force which varies as a direct function of variations in engine output speed is applied to the valve spool 22a across the piston 280. To provide this force, an orifice 290 is disposed in the line 292 connected with an engine driven charge pump 106a. Fluid pressure from the upstream side of the orifice 290 is conducted to a pressure chamber 296 through a conduit 298. Similarly, the fluid pressure on the downstream side of the orifice 290 is conducted to a chamber 302 through a conduit 304.

During operation of the vehicle with which the control system 10a is associated, the pressure differential across the orifice 290 varies as a direct function of variations in the output speed of the engine 12a. When the engine 12a is operating at a relatively low speed, there is a small pressure differential across the orifice 290 and the pressure conducted to the chamber 296 is only slightly greater than the pressure conducted to the chamber 302. However as engine speed increases and the effect of the orifice 290 becomes more pronounced, the pressure in the chamber 296 increases substantially relative to the pressure in the chamber 302. The pressure differential across the piston 280 varies as a direct function of variations in engine output speed. It should be noted that the pressure differential across the piston 280 urges the valve spool 22a in a direction to increase the fluid pressure conducted to the directional control valve 32a and the motor 34a.

Upon actuation of the directional control valve 32a to either a forward or reverse operating condition, the fluid pressure in the higher pressure of one of the two chambers 44a or 46a is conducted through a conduit 308 to an internal passage 130a in the valve spool 22a. This fluid pressure is conducted to a pressure chamber 134a. The feedback pressure in the chamber 134a urges the valve spool 22a toward the right, to connect the valve spool with a drain passage 56a. It should be noted that leftward movement of the valve spool 22a ports fluid pressure from a passage 104a to the passage 308 and the motor unit 34a.

Actuation of the throttle control assembly moves an input shaft 312 to compress a spring 102a to apply a force to the valve spool 22a. This force varies as a function of variations in throttle setting in much the same manner as in which movement of the accelerator pedal 84 resulted in movement of the arm 198 of FIG. 3 to apply a pressure to the spring 102 and valve spool 22. Since the shaft 312 has a head end 314 which is disposed in the pressure chamber 134a, a passage 318 is formed in the head 314 to enable it to move relatively free within the pressure chamber 134a.

Actuation of a brake pedal 236a effects operation of the motor 34a to reduce the displacement of the pump unit 14a prior to actuation of the vehicle brakes by movement of an actuator shaft 252a. Thus, depressing the brake pedal 236a causes a link 240a to pivot a link 242a about a pivot connection 322. As the link 242a pivots in a clockwise direction (as viewed in FIG. 4)

about the pivot connection 322, a link 324 actuates a valve 326 to connect a drain passage 328 with a passage 330 through which fluid under pressure is ported to the chamber 44a to 46a of the motor 34a. Of course, connecting the passage 330 with drain enables a biasing spring assembly 334 in the motor unit 34 to effect operation of the motor to the neutral position. When the valve 326 is moved toward the right through a sufficient distance to engage an end wall 338, continued depression of the brake pedal 236a causes the link 242a to pivot about a connection 340 to pull the brake assembly actuator shaft 234a toward the left (as viewed in FIG. 4). This leftward movement of the shaft 234a actuates the vehicle brakes in the manner previously explained.

In view of the foregoing description, it can be seen that the hydrostatic transmission control system 10 includes a main valve assembly 20 having a valve member 22 which is movable under the influence of three separate forces to vary the output speed of the hydrostatic transmission 16. Thus, the control valve 22 is urged in a direction (toward the right as viewed in FIG. 1) tending to increase the displacement of the hydrostatic transmission under the influence of a force which varies as a function of variations in output speed of the engine 12. The valve member 22 is urged in a direction (toward the left as viewed in FIG. 4) tending to reduce the displacement of the pump unit 14 under the influence of a force which varies as a function of variations in the setting of the throttle control assembly 28. In addition the valve member 22 is urged in a direction (toward the left as viewed in FIG. 1) tending to reduce the displacement of the pump unit 14 under the influence of a fluid pressure feedback force which varies as a function of variations in the displacement of the pump unit.

To reduce wear on the vehicle braking system 234 and to provide for low speed or inching control of the vehicle, a brake pedal 236 is connected with a linkage 64 to effect a reduction in the output speed of the hydrostatic transmission prior to actuation of the vehicle brakes. In the embodiment of the invention illustrated in FIG. 4, actuation of the vehicle brake pedal 236a operates a valve 326 to effect a deswashing of the pump unit 14a prior to actuation of the vehicle brakes. Once the pump unit 14 or 14a has been deswashed, further depressing of the brake pedal effects actuation of the vehicle brakes.

Having described specific preferred embodiments of the invention, the following is claimed:

1. An apparatus comprising an engine, selectively settable throttle means for varying the operating speed of said engine, a hydrostatic transmission having a pump unit driven by said engine and a motor unit drivingly connected with an output member, fluid motor means for varying the displacement of at least one of said units of said hydrostatic transmission, valve means for porting fluid to said motor means, said valve means including a valve member which is movable to vary the fluid pressure ported to said motor means, means for applying to said valve member a first force which varies as a function of the operating speed of said engine and which urges said valve member in a first direction, means for applying to said valve member a second force which varies as a function of throttle setting and which urges said valve member in a second direction opposite from said first direction, and means for applying to said valve member a third force which varies as a function of the fluid pressure conducted to said motor means from said valve means and which urges said valve member in said second direction.

2. An apparatus as set forth in claim 1 further including brake means operable between a disengaged condition in which said brake means is ineffective to retard movement of a vehicle associated with said hydrostatic transmission and an engaged condition in which said brake means is effective to retard movement of the vehicle, actuator means movable from a first position to a second position to effect operation of said brake means from the disengaged condition to the engaged condition, and means for rendering said hydrostatic transmission ineffective to drive said output member in response to movement of said actuator means from said first position toward said second position.

3. An apparatus as set forth in claim 2 wherein sais means for rendering said hydrostatic transmission ineffective to drive said output member includes a link pivotal about a first axis by said actuator means upon movement of said actuator means through a first portion of the distance from said first position to said second position and means responsive to pivotal movement of said link about said first axis to vary the displacement of said one unit of said hydrostatic transmission to thereby render said hydrostatic transmission ineffective to drive said output member, said link being pivotal about a second axis by said actuator means upon movement of said actuator means through a second portion of the distance from said first position to said second position, said actuator means including means for effecting operation of said brake means from the disengaged condition to the engaged condition in response to pivotal movement of said link about said second axis.

4. An apparatus as set forth in claim 2 wherein said means for rendering said hydrostatic transmission ineffective to drive said output member includes valve means for effecting operation of said motor means in response to movement of said actuator means from said first position toward said second position.

5. An apparatus as set forth in claim 2 wherein said means for rendering said hydrostatic transmission ineffective to drive said output member includes linkage means interconnecting said motor means and said one unit of said hydrostatic transmission, and means for effecting operation of said linkage means to vary the displacement of said one unit of said hydrostatic transmission in response to movement of said actuator means from said first position toward said second position.

6. An apparatus as set forth in claim 1 wherein said means for applying a first force to said valve member includes a flyweight operatively connected with said valve member and means for rotating said flyweight at a speed which varies as a function of the operating speed of said engine.

7. An apparatus as set forth in claim 1 wherein said means for applying a first force to said valve member includes surface means connected with said valve member and means for applying against said surface means a fluid pressure force which varies as a function of the operating speed of said engine.

8. An apparatus as set forth in claim 1 wherein said means for applying a second force to said valve member includes a first member connected with said throttle means, a second member movable relative to said valve member to vary the magnitude of said second force, means for retarding rapid movement of said second member upon rapid actuation of said throttle means, and resiliently yieldable means for enabling said first member to move relative to said second member upon rapid actuation of said throttle means and for subsequently effecting movement of said second member relative to said first member.

9. An apparatus as set forth in claim 8 wherein said means for retarding rapid movement of said second member is effective to retard rapid movement of said second member upon rapid actuation of said throttle means to increase the operating speed of said engine and is ineffective to retard rapid movement of said second member upon rapid actuation of said throttle means to decrease the operating speed of said engine.

10. An apparatus as set forth in claim 1 wherein said means for applying a third force to said valve member includes surface means connected with said valve member and at least partially defining a pressure chamber, and means for transmitting fluid pressure from said motor means to said pressure chamber.

11. An apparatus as set forth in claim 1 further including restriction means to control the fluid flow to said fluid motor means to control the rate at which the displacement of said one unit of said hydrostatic transmission is increased.

12. An apparatus as set forth in claim 1 further including restriction means to control the fluid flow from said fluid motor means to control the rate at which the displacement of said one unit of said hydrostatic transmission is decreased.

13. An apparatus comprising an engine, selectively settable throttle means for varying the operating speed of said engine, a hydrostatic transmission having a pump unit driven by said engine and a motor unit drivingly connected with an output member, fluid motor means for varying the displacement of at least one of said units of said hydrostatic transmission, said fluid motor means including relatively movable piston and cylinder means for defining first and second expansible chambers and spring means for urging said piston and cylinder means toward a first position relative to each other, valve means operable between a first condition porting fluid at a relatively high pressure to one of said expansible chambers to effect relative movement between sais piston and cylinder means from said first position against the influence of said spring means to vary the sizes of said expansible chambers and a second condition connecting said first and second expansible chambers with drain to enable said spring means to move said piston and cylinder means to said first position relative to each other, said valve means including a valve member which is movable to vary the fluid pressure ported to said motor means, means for applying to said valve member a first force which varies as a function of the operating speed of said engine and which urges said valve member in a first direction, and means for applying to said valve member a second force which varies as a function of throttle setting and which urges said valve member in a second direction opposite from said first direction.

14. An apparatus as set forth in claim 13 further including brake means operable between a disengaged condition in which said brake means is ineffective to retard movement of a vehicle associated with said hydrostatic transmission and an engaged condition in which said brake means is effective to retard movement of the vehicle, actuator means movable from a first position to a second position to effect operation of said brake means from the disengaged condition to the engaged condition, and means for rendering said hydrostatic transmission ineffective to drive said output member in response to movement of said actuator means from said first position toward said second position.

15. An apparatus as set forth in claim 13 wherein said means for applying a first force to said valve member includes a flyweight operatively connected with said valve member and means for rotating said flyweight at a speed which varies as a function of the operating speed of said engine.

16. An apparatus as set forth in claim 13 wherein said means for applying a first force to said valve member includes surface means connected with said valve member and means for applying against said surface means a fluid pressure force which varies as a function of the operating speed of said engine.

17. An apparatus as set forth in claim 13 wherein said means for applying a second force to said valve member includes a first member connected with said throttle means, a second member movable relative to said valve member to vary the magnitude of said second force, means for retarding rapid movement of second member upon rapid actuation of said throttle means, and resiliently yieldable means for enabling said first member to move relative to said second member upon rapid actuation of said throttle means and for subsequently effecting movement of said second member relative to said first member.

18. An apparatus as set forth in claim 13 further including means for applying to said valve member a third force which varies as a function of the fluid pressure conducted to said motor means from said valve means and which urges said valve member in said second direction.

19. An apparatus comprising an engine, selectively settable throttle means for varying the operating speed of said engine, a hydrostatic transmission having a pump unit driven by said engine and a motor unit drivingly connected with an output member, fluid motor means for varying the displacement of at least one of said units of said hydrostatic transmission, valve means for porting fluid to said motor means, said valve means including a valve member which is movable to vary the fluid pressure ported to said motor means, means for applying to said valve member a first force which varies as a function of the operating speed of said engine and which urges said valve member in a first direction, and means for applying to said valve member a second force which varies as a function of throttle setting and which urges said valve member in a second direction opposite from said first direction, said means for applying a second force to said valve member including a first member connected with said throttle means, a second member movable relative to said valve member to vary the magnitude of said second force, means for retarding rapid movement of said second member upon rapid actuation of said throttle means, and resiliently yieldable means for enabling said first member to move relative to said second member upon rapid actuation of said throttle means and for subsequently effecting movement of said second member relative to said first member.

20. An apparatus as set forth in claim 19 wherein said means for retarding rapid movement of said second member is effective to retard rapid movement of said second member upon rapid actuation of said throttle means to increase the operating speed of said engine and is ineffective to retard rapid movement of said second member upon rapid actuation of said throttle means to decrease the operating speed of said engine.

21. An apparatus as set forth in claim 19 further including brake means operable between a disengaged condition in which said brake means is ineffective to retard movement of a vehicle associated with said hydrostatic transmission and an engaged condition in which said brake means is effective to retard movement of the vehicle, actuator means movable from a first position to a second position to effect operation of said brake means from the disengaged condition to the engaged condition, and means for rendering said hydrostatic transmission ineffective to drive said output member in response to movement of said actuator means from said first position toward said second position.

22. An apparatus comprising a hydrostatic transmission having pump and motor units, one of said units including a member which is movable to vary the displacement of said one unit and the output speed of said hydrostatic transmission, a fluid motor, linkage means connecting said fluid motor with said member and movable in a direction to move said member upon operation of said fluid motor, valve means for porting fluid to said motor to effect operation of said motor to move said linkage and move said member to vary the displacement of said one unit, brake means operable between a disengaged condition in which said brake means is ineffective to retard movement of a vehicle associated with said hydrostatic transmission and an engaged condition, and actuator means movable from a first position to a second position to effect operation of said linkage means to move said member and reduce the output speed of said hydrostatic transmission and to effect operation of said brake means from the disengaged condition to the engaged condition.

23. An apparatus as set forth in claim 22 wherein said linkage means includes a link pivotal about first and second axes, said actuator means including means for pivoting said link about said first axis to effect operation ot said linkage means to move said member and for pivoting said link about said second axis to effect operation of said brake means from said disengaged condition to said engaged condition.

24. An apparatus as set forth in claim 22 further including an engine for driving said hydrostatic transmission, selectively settable throttle means for varying the operating speed of said engine, said valve means including a valve member which is movable to vary the fluid pressure ported to said motor means, means for applying to said valve member a first force which varies as a function of the operating speed of said engine and which urges said valve member in a first direction, and means for applying to said valve member a second force which varies as a function of throttle setting and which urges said valve member in a second direction opposite from said first direction.

25. An apparatus as set forth in claim 23 wherein said actuator means pivots said link about said first axis to move said member to a position to reduce the output speed of said hydrostatic transmission to zero and pivots said link about said second axis to effect operation of said brake means to the engaged position upon movement of said member to said position at which said hydrostatic transmission is at zero speed.

* * * * *